No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 1.

Witnesses
C. G. Bassler
Geo. A. Saul

Inventor
Chas. V. Rote
By Wm. R. Gerhart
Attorney.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 2.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 3.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 4.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 6.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 7.

No. 724,508. PATENTED APR. 7, 1903.
C. V. ROTE.
COMBINED RAIL AND WHEEL CAR BRAKE.
APPLICATION FILED JUNE 4, 1901.
NO MODEL. 9 SHEETS—SHEET 8.

Witnesses.
C. G. Bassler.
Geo. A. Fane

Inventor.
Chas. V. Rote
By Wm. R. Gerhart
Attorney.

UNITED STATES PATENT OFFICE.

CHARLES V. ROTE, OF LANCASTER, PENNSYLVANIA, ASSIGNOR, BY MESNE ASSIGNMENTS, TO JOHN F. BRIMMER, OF LANCASTER, PENNSYLVANIA, AND JOSEPH F. CULLMAN, OF NEW YORK, N. Y.

COMBINED RAIL AND WHEEL CAR-BRAKE.

SPECIFICATION forming part of Letters Patent No. 724,508, dated April 7, 1903.

Application filed June 4, 1901. Serial No. 63,063. (No model.)

*To all whom it may concern:*

Be it known that I, CHARLES V. ROTE, a citizen of the United States, and a resident of Lancaster, in the county of Lancaster and State of Pennsylvania, have invented certain Improvements in a Combined Rail and Wheel Car-Brake, of which the following is a specification.

This invention relates to that class of car-brakes wherein brake-shoes are applied both to the rails of the track and to the wheels of the car, and it is especially adapted to the car-brake shown and described in Letters Patent No. 646,609, dated April 3, 1900.

The objects of this invention are, first, to so construct the operating parts that they will occupy less space than they have heretofore done; second, to simplify the connection between the wheel brake-block and its support; third, to prevent undue lateral vibration of the rail brake-block; fourth, to allow the outer end of the rail brake-block to have an automatically-vertical movement; fifth, to connect the stationary instead of the active parts of oppositely-located rail-brakes; sixth, to improve the means for the longitudinal adjustment of the rail brake-shoe in relation to the wheel; seventh, to preserve a uniform elevation of the rail brake-shoes in relation to the truck, and, eighth, to adjust a brake mechanism to wheels of different diameters. I attain these objects by the mechanism illustrated in the accompanying drawings, forming a part of this specification, and in which—

Figure 1 is an outer side elevation of a portion of a truck having applied thereto a brake mechanism embodying my invention, and Fig. 2 an inner side elevation of the corresponding mechanism on the opposite side of the truck. Fig. 8 is a perspective view of a loop-link through which the wheel brake-block may be supported, and Fig. 9 a similar view of a rod-link. Fig. 10 is a rear perspective view of a brake-lever embracing the link and the wheel and Fig. 11 a similar perspective view of a link embracing the brake-lever. Fig. 12 is a top plan view of a rail brake-block and its connections; Fig. 13, a front perspective view of a rail brake-block; Fig. 14, a similar perspective view of a frame supporting the outer end of the rail brake-block; Fig. 15, a front perspective view of the bracket supporting said frame, and Fig. 16 a longitudinal vertical section of the connection between said frame and the bracket supporting the same.

Similar numerals indicate like parts throughout the several views.

Referring to the details of the drawings, 1 indicates the side bars of the truck, and 2 a cross-bar connecting said side bars, through which cross-bar the outer ends of the rail brake-blocks are supported.

3 refers to the wheels, and 4 to the truck-frame arm from which the wheel brake-blocks are supported.

5 indicates a hanger having its upper end threaded and engaging a sleeve-nut 6, the stem whereof passes loosely through a hanger-arm, to be described, one end of which is supported by said truck-arm 4. The head of sleeve-nut 6 bears on the hanger-arm, whereby the hanger is adjusted vertically.

Figure 2:
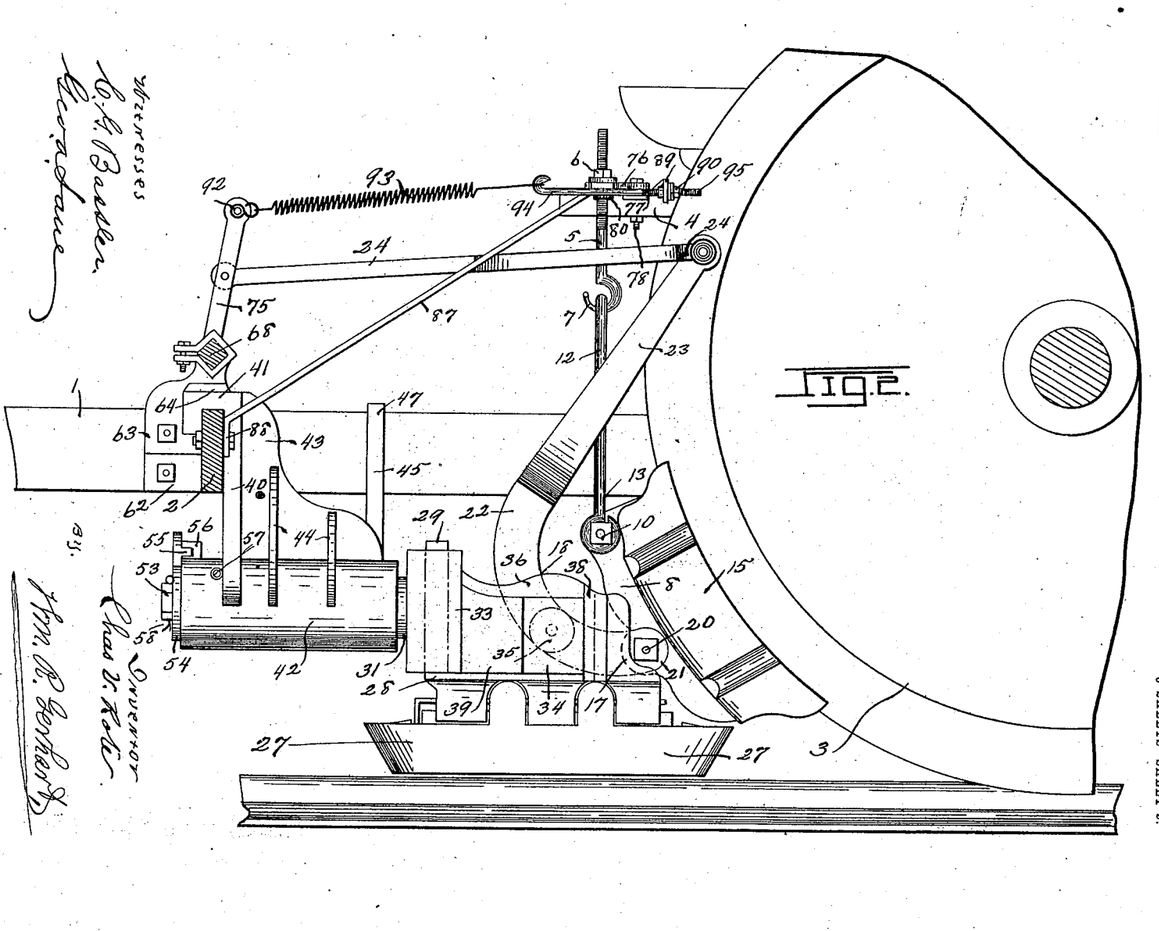
Figures 3, 4:
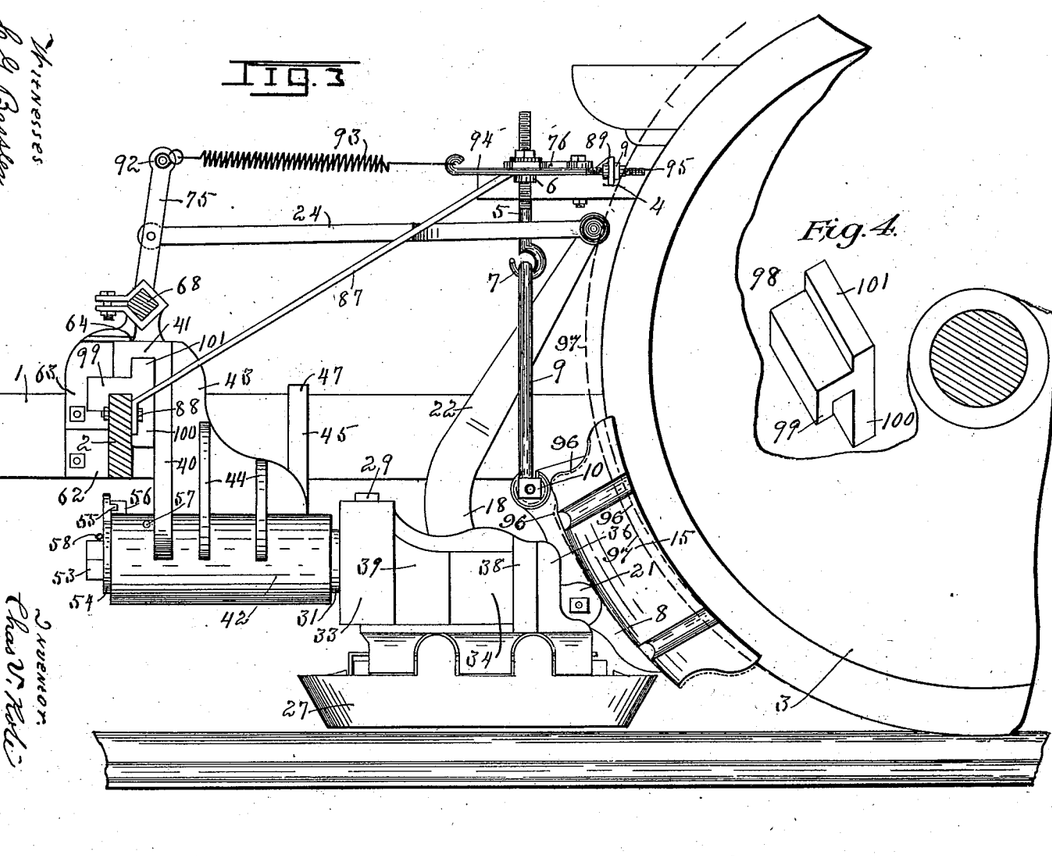
Fig. 3 is an inner side elevation of said mechanism, showing the change effected in the position of the parts by the use of a shim-plate.
Fig. 4, a rear perspective view of the shim-plate.
Figures 5, 6, 7:
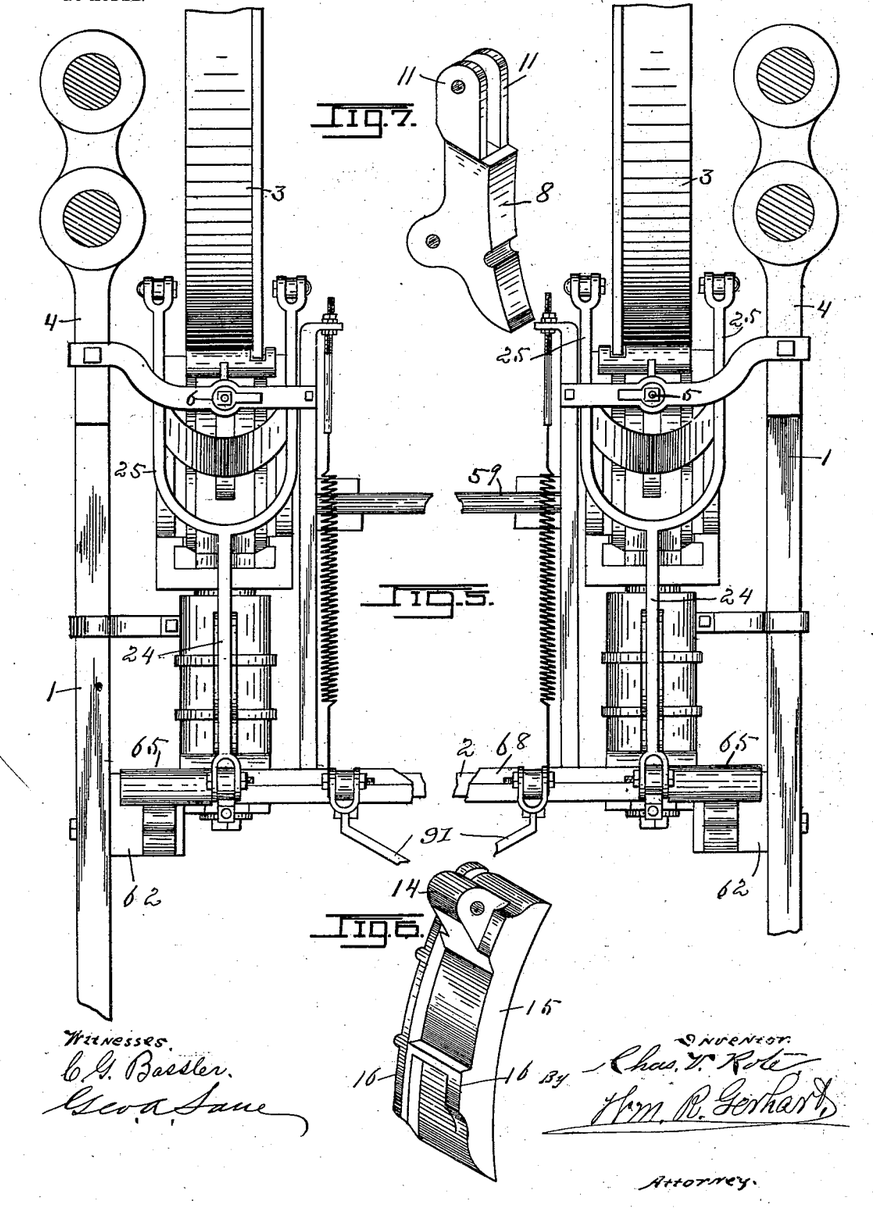
Fig. 5 is a top plan view of the brake mechanism applied to both sides of a truck.
Figs. 6 and 7 show, respectively, a rear perspective view of the wheel brake-shoe and a front perspective view of the wheel brake-block.
Figures 8, 9, 10, 11:
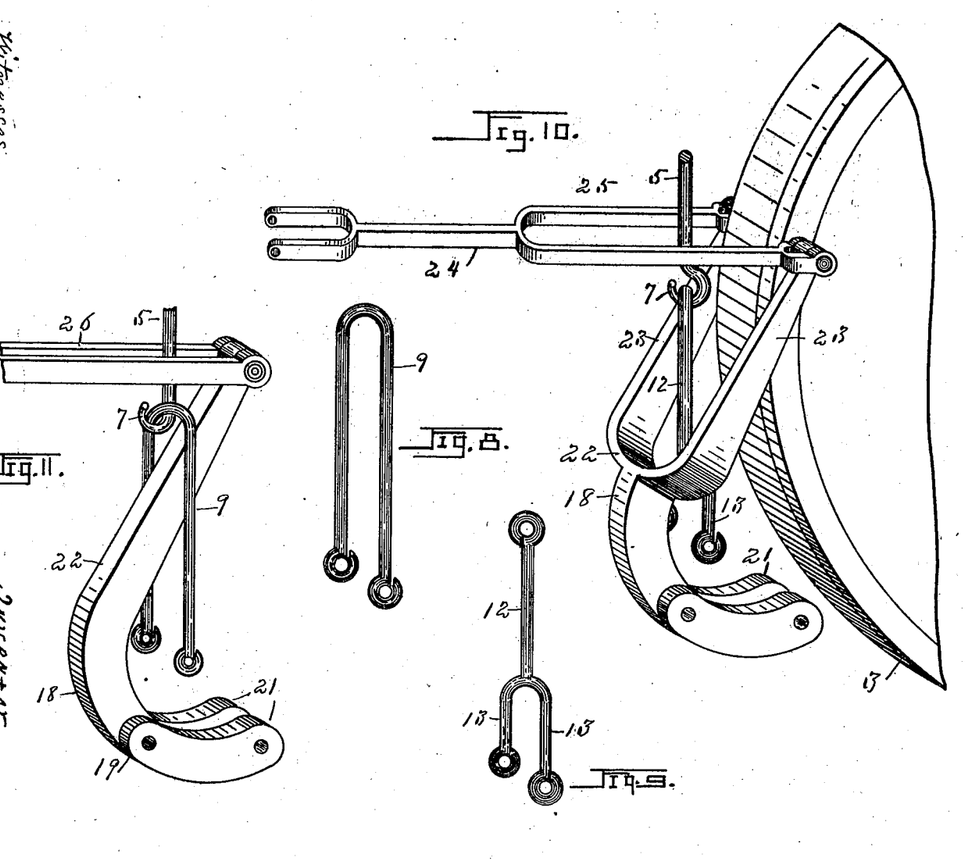
Figures 12, 13, 14, 15, 16:
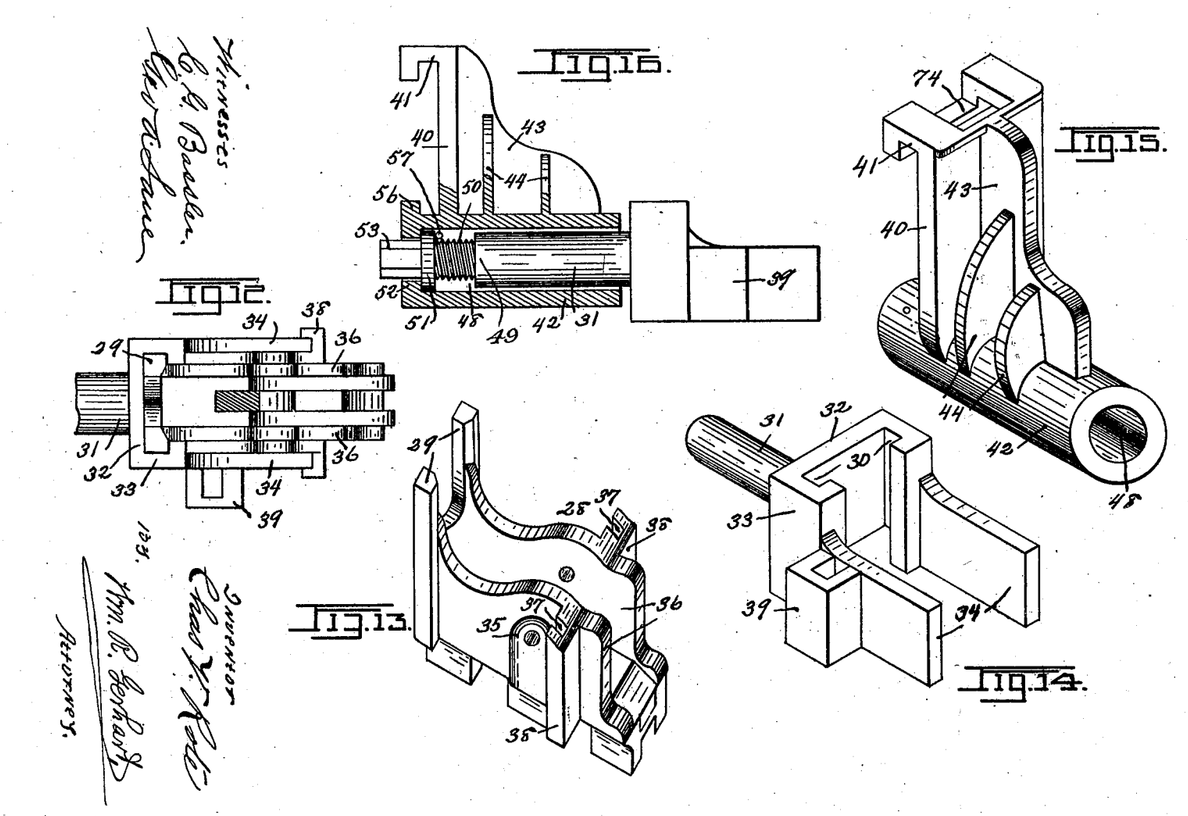
Figures 17, 18, 19:
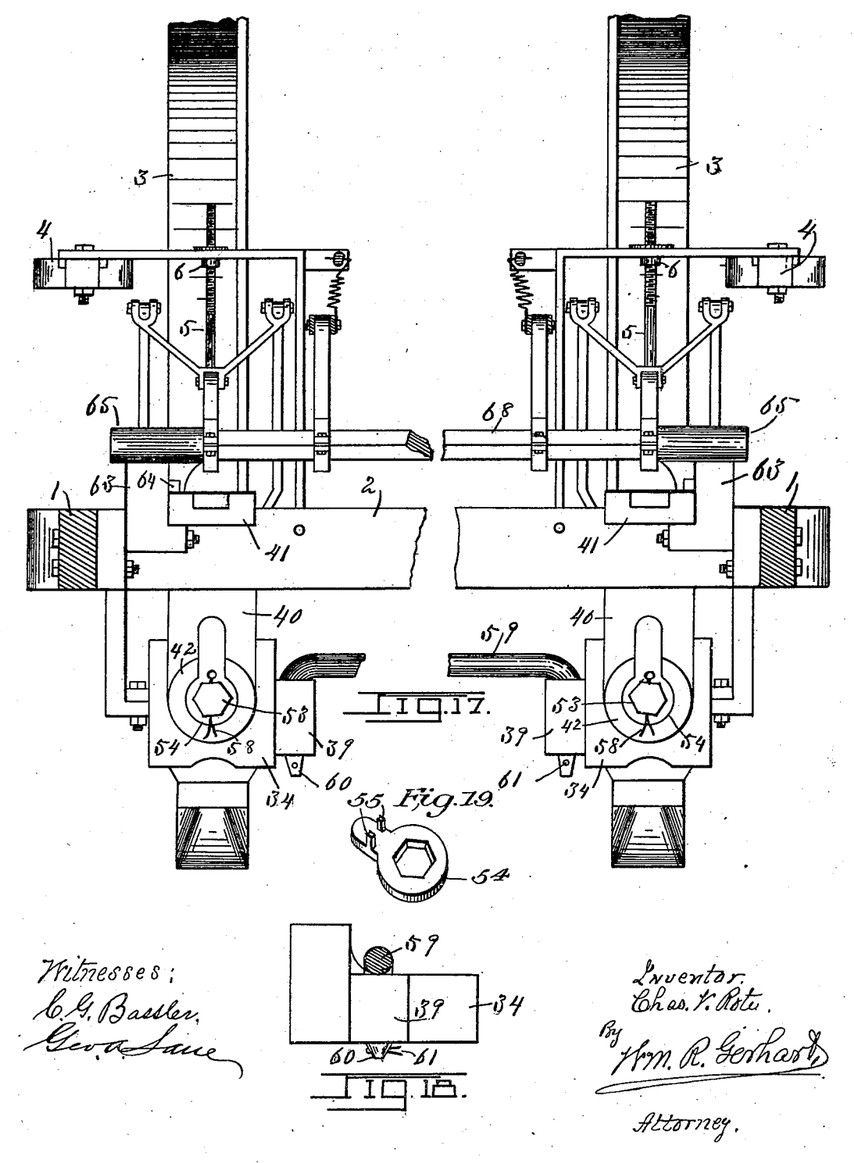
Fig. 17 is a rear elevation of a brake attached to a truck.
Fig. 18 is an elevation of the inner face of a rail brake-block, showing the connection between the same and the tie-rod.
Fig. 19 is a perspective view of the "hex" lock-plate.
Figures 20, 21:
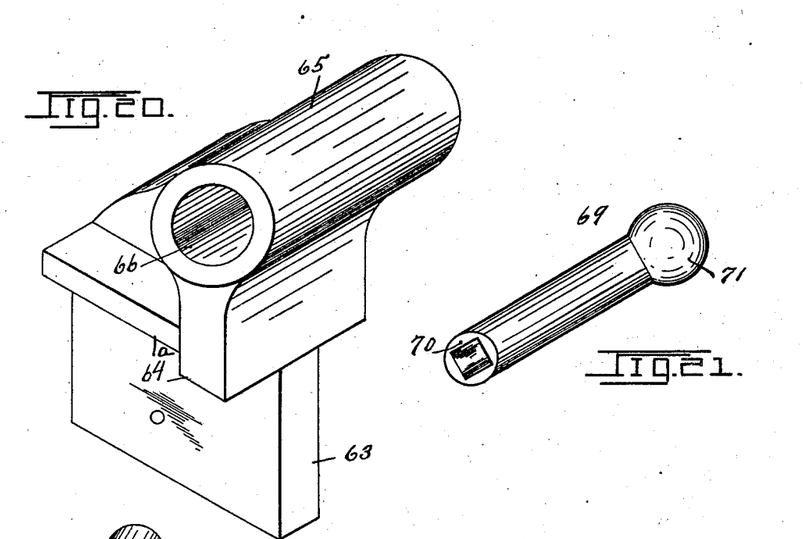
Fig. 20 is an inner perspective view of a rock-shaft bearing and of the plate supporting the same.
Fig. 21, an inner perspective view of a bearing-cap of the rock-shaft.
Figure 22:
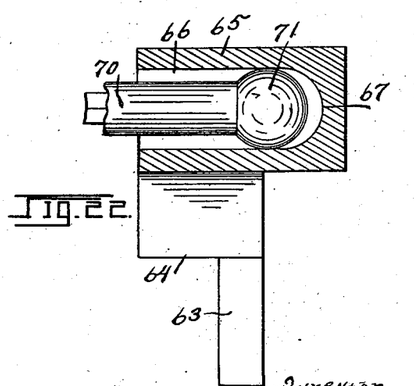
Fig. 22, a longitudinal section of a rock-shaft bearing, and Fig. 23 a rear perspective view of a rock-shaft arm.
Figure 23:
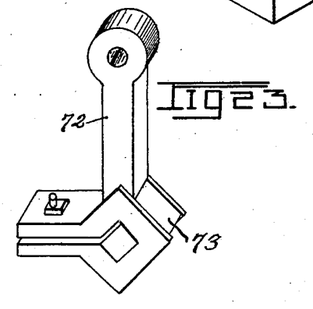
Figures 24, 26:
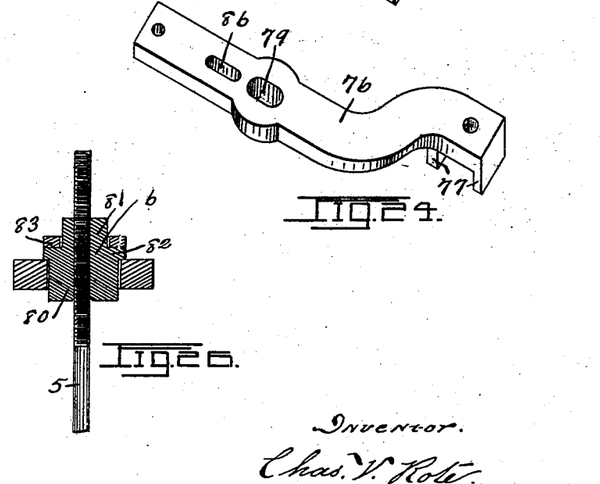
Fig. 24 is an inner perspective view of the hanger-arm.
Fig. 26, a vertical section of the connection between the hanger and the hanger-arm.
Figures 25, 27:
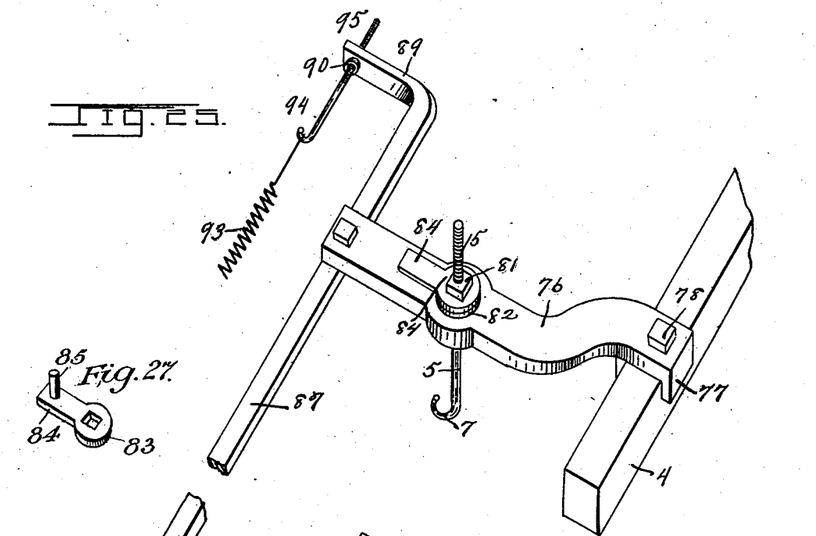
Fig. 25 is an inner perspective view of the hanger-arm, the strut, the spring for retracting the brake-lever, and the connections of those parts.
Fig. 27 is a bottom perspective view of the lock-plate 83, showing the pin projecting from the arm thereof.

To a hook 7 on the lower end of hanger 5 is suspended a link, the lower end whereof is pivotally attached to the upper end of wheel brake-block 8. This link may be formed of a loop 9, as shown in Figs. 3, 8, and 11, having eyes on the lower ends thereof embracing jaws on the upper extremity of wheel brake-block 8, to which it is pivotally secured by a pin 10, passing through said eyes and corresponding openings in jaws 11 on the top of the wheel brake-block, or said link may consist of a single rod 12, having jaws 13 on its lower end provided with eyes in their extremities and adapted to also embrace the jaws 11 on the top of the wheel brake-block, as shown in Figs. 2, 9, and 10. The rearwardly-extending lug 14 on the upper end of the wheel brake-shoe 15 takes between said jaws 11 on the top of the wheel brake-block and is also secured thereto by the pin 10. On the back of the lower end of the wheel brake-shoe 15 are rearwardly-extending lips 16, forming a socket that receives the lower end of the wheel brake-block 8, preventing lateral movement of the lower ends of those parts in their relation the one to the other. The wheel brake-block has on its back and somewhat below the center a perforated lug 17, through which it is connected with the brake-lever. The brake-lever is bent, as shown at 18, and it is fulcrumed through its lower and approximately horizontal arm 19 in the rail brake-block, to be described, on a pivot pin or bolt 20, and the extremity of lever-arm 19 is bifurcated, forming jaws 21, that embrace and are pivotally connected with lug 17 of wheel brake-block 8. Power must be applied to the brake-lever in the vertical plane of the rail and of the tread of the wheel. To accomplish this, by reason of the contracted space found beneath many cars the upper or operating arm 22 of the brake-lever must lap the link through which the wheel brake-block is supported. For this reason said link is formed of a loop 9, and the arm 22 of the brake-lever is curved forward between the sides of loop 9, as shown in Figs. 3, 8, and 11; but the space may be so contracted as to necessitate the lapping of the wheel by arm 22 of the brake-lever. In this case the link through which the wheel brake-block is supported is formed of a single rod 12, and said lever-arm 22 is bifurcated, forming jaws 23, that are extended forward and embrace both link-rod 12 and the periphery of the wheel, as shown in Figs. 2, 9, and 10. In both cases the brake-lever is actuated through a connecting-rod 24, the end thereof pivoted to said brake-lever being bifurcated, as shown at 25 in Fig. 10 or 26 in Fig. 11.

27 indicates a rail brake-shoe connected with the rail brake-block 28 in any suitable manner. This rail brake-block is of a box shape, open on top and at the end adjacent to the wheel, and between the side walls of this box the brake-lever is fulcrumed on a pin engaging said side walls and passing through arm 19 of the brake-lever. The rail brake-block has a cross-head formation on its outer end, on the opposite sides whereof are upright guides 29, extending above the body of said block and engaging guideways 30 in a guide-frame formed on the inner end of a sleeve 31. The guide-frame comprises a cross-plate 32, having cheeks 33, wherein are located said guideways 30. From cheeks 33 jaws 34 extend forward and embrace the bosses 35, formed about the openings in side walls 36 of brake-block 28, wherein is engaged the pivot-pin on which the brake-lever is fulcrumed. The ends of jaws 34 engage grooves 37 in vertical L-ribs 38, formed on side walls 36, preventing undue lateral movement of the rail brake-shoe. In a wing 39 on inner jaw 34 of said guide-frame is a vertical opening adapted to be engaged by a prong on the tie-rod, to be described.

On cross-bar 2 is a bracket comprising a back plate 40, having a hook 41, taking over the top of cross-bar 2, a tubular bearing 42, suspended from back plate 40, a rib 43, disposed in the angle between and formed with back plate 40 and tubular bearing 42, and ribs 44, formed with and transversely of said bearing 42 and rib 43. The cross-bar 2 and back plate 40 are secured together by one or more bolts. The bracket is further braced in position by the hanger 45, secured to a lug 46 on the outer side of tubular bearing 42 and extending upward and having a hook 47 on the upper end thereof that takes over the adjacent side bar 1 of the truck. Sleeve 31 on the back of cross-plate 32 of the guide-frame engages the inner end of bore 48 in tubular bearing 42 of said bracket. The outer end 49 of the bore of sleeve 31 is threaded and is engaged by a set-screw 50, located in bore 48 of said tubular bearing. Set-screw 50 has a collar 51 thereon, that engages the end wall 52 of bore 48 of the tubular bearing, and on said set-screw and back of collar 51 is a hex-head 53, that projects through an opening in said outer wall 52 of the tubular bearing and whereby said set-screw is actuated. On hex-head 53 is a detent that prevents accidental turning of set-screw 50, said detent consisting of a plate 54, having an opening therein of the shape and size of said hex-head, and jaws 55 on the upper portion thereof that engage opposite sides of a stud 56 on the top of tubular bearing 42.

In assembling the parts connected with the bracket set-screw 50 is engaged with the threaded end of sleeve 31 of the guide-frame, and then said set-screw and sleeve are pushed through the front end of tubular bearing 42 until collar 51 on said set-screw bears against end wall 52 of the tubular bearing. Longitudinal movement of the set-screw is prevented by passing a pin 57 in front of collar 51 and through openings in the walls of tubular bearing 42. By this construction the rail brake-block may be adjusted longitudinally in relation to the wheel. After the assembling of these parts or any adjustment by the set-screw the detent is slipped over hex-head 53, with the jaws 55 thereof engaging stud 56, the detent being held in place by a pin 58, passing through a hole in said hex-head.

59 indicates a tie-rod connecting oppositely-located rail brake-blocks. The ends of tie-rod 59 are flattened and turned downward to form prongs 60, engaging the vertical openings in wings 39 on the inner jaws 34 of the guide-frames. Prongs 60 are prevented from jumping out of said vertical openings by cotter-pins 61.

The ends of cross-bar 2 are turned at right angles therewith and form lips 62, that bear against the truck side bars 1, through which lips the cross-bar is fastened to said side bars. Secured to the inner faces of each lip 62 by the rivets or bolts fastening said lip to side bars 1 is a vertical plate 63, having a projection that extends over cross-bar 2 and which, with a horizontal rib on the inner side of said plate, rests on the top of hook 41, said projection and rib being shown at 64. On the upper end of plate 63 is a cylindrical bearing 65, disposed parallel with cross-bar 2, and said bearing is cored out to form a socket 66, having a hemispherical inner end 67.

68 indicates the rock-shaft, through which the brake-levers are operated. The rock-shaft is angular in cross-section and its ends loosely engage similarly-shaped sockets in caps 69. Each cap 69 consists of a cylindrical sleeve 70 of less diameter than socket 66 of cylindrical bearing 65 and having on the outer end thereof a spherical enlargement 71 of greater diameter than said sleeve and adapted to fit the hemispherical end 67 of the socket of cylindrical bearing 65, thus forming ball-and-socket connections between the rock-shaft and its supports, whereby said rock-shaft automatically adapts itself to inequalities in the alinement of its bearings and to other slight differences in the brake mechanism actuated therethrough on opposite sides of the truck.

The construction just described, whereby the tie-rod 59 and the rock-shaft 68 are connected with their supports, renders easy the assembling of the parts and prevents any such rigidity in those connections that would so bind the brakes as to stiffen the movements of the same.

An arm 72, having an elastic head 73, through which the rock-shaft passes, is secured to said rock-shaft inside of each bearing thereof and in line with the wheel in its front, a recess 74 being formed in the top of hook 41 of bracket back plate 40 to receive the lower part of said elastic head 73, and on the rock-shaft and inside of each arm 72 is an arm 75, longer than arm 72 and also secured to the rock-shaft through an elastic head similar to that on said arm 72.

76 indicates the hanger-arm, having on the under side of the outer end thereof transverse ribs 77, that embrace truck-arm 4, said hanger-arm being secured to the truck-arm by a bolt 78. From the truck-arm the hanger-arm extends inward with a slight curve from the wheel, and it has therein a slot 79, located opposite the tread of the wheel, through which slot passes the stem 80 of sleeve-nut 6, said slot being elongated lengthwise of the hanger-arm to permit adjustment of the hanger transversely of the wheel. The upper end of sleeve-nut 6 consists of a hex-head 81, having formed around its lower edge an annular flange or washer 82, that rests on the hanger-arm. On washer 82 rests a lock-plate 83, having a "hex-shaped" opening wherethrough passes hex head 81, and on washer 82 is a short arm 84, having a pin 85 on the lower side thereof, that engages an opening 86, located in the hanger-arm inside of elongated slot 79, whereby the sleeve-nut is prevented from turning accidentally. The inner end of hanger-arm 76 is held in place by a brace 87, having one end secured to cross-bar 2, as shown at 88, whence it extends up to and under the inner end of said hanger-arm, to which it is bolted. Brace 87 is extended beyond the hanger-arm and the free end 89 thereof is bent inward, said free end having a horizontally-disposed orifice therein engaged by a sleeve-nut 90, similar to that already described.

Arms 72 on rock-shaft 68 are connected with the operating-arms 22 of the adjacent brake-levers by the rods 24, and the brakes on opposite sides of the truck are applied throuhg a segmental bar 91, as is usual, the ends whereof are pivotally connected with rock-shaft arms 75 through bolts 92. After the application of the power through which the brake-shoes are applied ceases said shoes are retracted through springs 93, each spring having one end secured to one of said pivot-bolts 92 and the other end to a hook-rod 94, having its threaded end 95 passing through sleeve-nut 90 in the free end 89 of brace 87.

The same brake apparatus may be applied to wheels of different diameters. In Fig. 3 a brake is shown in broken lines 96 as applied to the wheel shown by broken lines 97, and the same brake is shown in full lines applied to a wheel, also shown in full lines, of less diameter than the wheel shown in broken lines. This result is attained by inserting a shim-plate 98 between cross-bars 2 and hook 41 of back plate 40 of the bracket supporting the outer end of the rail brake-block. In this case a plate 63 is used that is deeper than that employed when the brake is applied to the larger wheel. The hook 99 of the shim-plate takes over cross-bar 2, and the front part 100 of said plate is of such thickness as to take up the horizontal difference in the diameters of the wheels, and the shoulder 101 is of such height as to take up the vertical difference in said diameters in so far as the application of the brakes is affected thereby.

I do not restrict myself to the details of construction herein shown and described, as it is obvious that many alterations might be made therein without departing from the principle and scope of my invention.

Having thus described my invention, what I claim as new, and desire to secure by Letters Patent, is—

1. In combination, a wheel, a wheel brake-shoe, a hanger through which said brake-shoe is supported, and means for adjusting the hanger transversely of the wheel.

2. In combination, a wheel, a wheel brake-shoe, an arm located above said brake-shoe and having a slot therein disposed transversely of the wheel, a hanger through which the wheel brake-shoe is supported and passing through said slot, and means whereby the hanger may be secured to said arm and adjustably of the length of the slot.

3. In combination, a wheel, and a wheel brake-shoe adjustable vertically and transversely in relation to the wheel.

4. In combination, a wheel, a wheel brake-shoe, and a hanger through which said brake-shoe is supported and adjustable both vertically and transversely in relation to the wheel.

5. In combination, a wheel, a wheel brake-shoe, an arm located above said brake-shoe and having a slot therein disposed transversely of the wheel, a hanger through which the wheel brake-shoe is supported and passing through said slot, and a nut on the upper end of the hanger.

6. In combination, a wheel, a wheel brake-shoe, an arm located above said brake-shoe and having a slot therein disposed transversely of the wheel, a sleeve-nut having the stem thereof engaging said slot, and a hanger through which the wheel brake-shoe is supported and having its upper end engaged in the sleeve-nut.

7. In combination, a wheel, a wheel brake-shoe, an arm located above said brake-shoe and having a slot therein disposed transversely of the wheel, a sleeve-nut having the stem thereof engaging said slot, a hanger through which the wheel brake-shoe is supported and having its upper end engaged in the sleeve-nut, a rim on the head of the sleeve-nut and bearing on the arm, and a ring-plate resting on said rim and having a projection thereon engaging a detent.

8. The combination in a car-brake, of a wheel brake-shoe, a hanger through which the wheel brake-shoe is supported, a rail brake-shoe, and a brake-lever connected with the rail brake-shoe and crossing said hanger.

9. The combination, in a car-brake, of a wheel brake-shoe, a loop-shaped hanger through which the wheel brake-shoe is supported, a rail brake-shoe, a brake-lever connected with the rail brake-shoe and crossing said hanger.

10. The combination, in a car-brake, of a wheel brake-shoe, a hanger through which the wheel brake-shoe is supported, a rail brake-shoe, a brake-lever connected with the rail brake-shoe and having a bifurcated arm crossing opposite sides of said hanger.

11. The combination, in a car-brake, of a rail brake-shoe, and a brake-lever connected with said brake-shoe and having a bifurcated arm embracing a wheel of the car.

12. The combination, in a car-brake, of a wheel brake-shoe, a hanger through which the wheel brake-shoe is supported, a rail brake-shoe, a brake-lever connected with the rail brake-shoe, and a bifurcated arm of the brake-lever crossing said hanger and embracing a wheel of the car.

13. The combination, in a car-brake, of a wheel brake-shoe, a hanger through which the wheel brake-shoe is supported, a rail brake-shoe, a brake-lever connected with the rail brake-shoe, and a bifurcated arm of the brake-lever embracing said hanger and a wheel of the car.

14. The combination, in a car-brake, of a wheel-truck, a bracket secured to the wheel-truck, a guide-frame adjustable in the bracket toward or from the wheel and having vertically-disposed guideways therein, a rail brake-block, and guides on the rail brake-block engaging the guideways in said guide-frame.

15. The combination, in a car-brake, of a wheel-truck, a bracket secured to the wheel-truck, a guide-frame adjustable in the bracket toward or from the wheel, a rail brake-block, and a connection between the guide-frame and a rail brake-block, whereby it is automatically adjusted vertically in its relation to said guide-frame, for the purpose specified.

16. The combination, in a car-brake, of a rail brake-block, vertical ribs on the inner end of the side walls of the rail brake-block and having grooves therein, a guide-frame, a vertically-disposed cross-head connection between the outer end of the rail brake-block and the guide-frame, and jaws on the cross-plate of the guide-frame and embracing the side walls of said brake-block and engaging the grooves in the vertical ribs thereon.

17. The combination, in a car-brake, of a rail brake-block, a brake-lever pivoted on a bolt supported in the side walls of said brake-block, a guide-frame, a vertically-disposed cross-head connection between the outer end of the rail brake-block and the guide-frame, and jaws on the cross-plate of the guide-frame and embracing the side walls of said brake-block and extending beyond the ends of said pivot-bolt.

18. The combination, in a car-brake, of a rail brake-block, a brake-lever pivoted on a bolt supported in the side walls of said brake-block, vertical ribs located on the side walls of said brake-block between the pivot-bolt and the inner ends of the brake-block and having grooves therein, a vertically-disposed cross-head connection between the outer end of the rail brake-block and the guide-frame, and jaws on the cross-plate of the guide-frame and embracing the side walls of said brake-block and engaging the grooves in the vertical ribs thereon.

19. The combination, in a car-brake, of a rail brake-shoe, a wheel brake-shoe, a connection between the rail brake-shoe and the wheel brake-shoe, a brace for the outer end of the rail brake-shoe and attached to the truck, a connection between said brace and the rail brake-shoe, whereby said shoe has an automatic vertical movement in relation to said truck, and means for adjusting the rail brake-shoe from or toward the wheel.

20. The combination, in a car-brake, of a rail brake-shoe, a wheel brake-shoe, a connection between the rail brake-shoe and the wheel brake-shoe, a brace for the outer end of the rail brake-shoe and attached to the truck, a connection between said brace and the rail brake-shoe, whereby said shoe has an automatic vertical movement in relation to said truck, and a device attached to said brace for adjusting the rail brake-shoe from or toward the wheel.

21. The combination, in a car-brake, of a rail brake-shoe, a wheel brake-shoe, a connection between the rail brake-shoe and the wheel brake-shoe, a bracket attached to the truck, a tubular bearing supported by the bracket, a guide-frame, an extension on the guide-frame and engaging the tubular bearing and adjustable lengthwise therein, and a connection between the rail brake-shoe and the guide-frame, whereby said rail brake-shoe has an automatic vertical movement in relation to the wheel-truck.

22. The combination, in a car-brake, of a rail brake-shoe, a wheel brake-shoe, a connection between the rail brake-shoe and the wheel brake-shoe, a bracket attached to the truck, a tubular bearing supported by the bracket, a guide-frame, an extension on the guide-frame having a threaded socket in its outer end and engaged in the tube of said bearing, a set-screw through the outer end of the tubular bearing and engaging the outer end of the socket in the extension of said frame, and a vertically-disposed cross-head connection between said frame and the rail brake-shoe.

23. The combination, in a car-brake, of a rail brake-block, a wheel brake-shoe, a connection between the rail brake-block and the wheel brake-shoe, a bracket attached to the truck and having a tubular bearing thereon, a guide-frame having vertically-disposed guideways therein, an extension on the guide-frame provided with a threaded socket in the inner end thereof engaged in the tubular bearing, a set-screw through the outer end of the tubular bearing and engaging the outer end of the socket in the extension of said frame, and guides on the rail brake-block and engaging the guideways in said guide-frame.

24. The combination, in a car-brake, of a rail brake-block, vertical ribs on the inner end of the side walls of the rail brake-block and having grooves therein, a wheel brake-shoe, a connection between the rail brake-block and the wheel brake-shoe, a bracket attached to the truck and having a tubular bearing thereon, a guide-frame having vertically-disposed guideways, an extension on the guide-frame provided with a threaded socket in the inner end thereof and engaged in the tubular bearing, a set-screw through the outer end of the tubular bearing and engaging the outer end of the socket in the extension of said frame, guides on the rail brake-block and engaging the guideways in said guide-frame, and jaws on the cross-plate of the guide-frame and embracing the side walls of said brake-block and engaging the grooves in the vertical ribs thereon.

25. The combination in a car-brake, of a rail brake-shoe, a wheel brake-shoe, a connection between the rail brake-shoe and the wheel brake-shoe, a guide-frame, a vertically-disposed cross-head connection between the rail brake-shoe and the guide-frame, a bracket attached to the truck and having a tubular bearing thereon, a flange around the inside of the outer end of the tubular bearing, an extension on the guide-frame provided with a threaded socket in the inner end thereof and engaged in the tubular bearing, a set-screw through the outer end of the tubular bearing and engaging the outer end of the socket in the extension of said frame, a collar on the set-screw and seated against said flange in the tubular bearing, and a removable detent located in front of said collar.

26. The combination, in a car-brake, of a rail brake-block, a brake-lever pivoted on a bolt supported in the side walls of said brake-block, a wheel brake-shoe, a connection between the rail brake-block and the wheel brake-shoe, vertical ribs having grooves therein and located on the side walls of the rail brake-block between the pivot-bolt therein and the inner end of said brake-block, a guide-frame having vertically-disposed guideways therein, guides on the rail brake-block and engaging the guideways in said guide-frame, jaws on the guide-frame and embracing the side walls of said brake-block and engaging the grooves in the ribs thereon, a bracket attached to the truck and supporting a tubular bearing, a flange around the inside of the outer end of the tubular bearing, an extension on the guide-frame provided with a threaded socket in the inner end thereof and engaged in the tubular bearing, a set-screw through the outer end of the tubular bearing and engaging the outer end of the socket in the extension of said frame, a collar on the set-screw and seated against said flange in the tubular bearing, and a removable detent located in front of said collar.

27. The combination, in a car-brake, of oppositely-located brake-levers, a rock-shaft, an operating connection between the rock-shaft and each of the brake-levers, supports on opposite sides of the truck for the rock-shaft, and ball-and-socket connections between the rock-shaft and its supports.

28. The combination, in a car-brake, of oppositely-located brake-levers, a rock-shaft, an operating connection between the rock-shaft and each of the brake-levers, journal-bearings of greater diameter than the rock-shaft, and rounded ends on the rock-shaft and engaging said bearings.

29. The combination, in a car-brake, of oppositely-located brake-levers, a rock-shaft, an operating connection between the rock-shaft and each of the brake-levers, journal-bearings of greater diameter than the rock-shaft, and caps on the ends of the rock-shaft and having rounded ends adapted to fit the journal-bearings.

30. The combination, in a car-brake, of oppositely-located brake-levers, a rock-shaft angular in cross-section, an operating connection between the rock-shaft and each of the brake-levers, journal-bearings having rounded inner ends, caps having stems of less diameter than the journal-bearings and fitting over the ends of the rock-shaft, and rounded ends on the caps of greater diameter than the stems thereof and fitting the rounded ends of the journal-bearings.

31. The combination, in a car-brake, of wheel brake-shoes and rail brake-shoes located adjacent to similarly-disposed wheels on opposite sides of the track, a brake-lever on each side of the track and located approximately in line with the brake-shoes on the same side of the track, operating connections between the brake-levers and the brake-shoes, a rock-shaft, arms on the rock-shaft and in line, respectively, with the brake-levers, operating connections between the rock-shaft and the brake-levers, arms on the rock-shaft and located inside of the arms connected with the brake-levers and longer than the same, a device for applying the brake-shoes attached to said longer arms, and retracting-springs connected with said longer arms.

32. The combination, in a car-brake, of a cross-bar connecting the side bars of the truck, wheel brake-shoes and rail brake-shoes located adjacent to similarly-disposed wheels on opposite sides of the truck, brackets attached to said cross-bar and approximately in line with the wheels of the truck, connections between the brackets and the rail brake-shoes, a brake-lever on each side of the truck and located approximately in line with the brake-shoes on the same side of the truck, operating connections between the brake-levers and the brake-shoes, plates secured to the truck side bars and supporting journal-bearings above the cross-bar, a rock-shaft journaled in the journal-bearings, arms on the rock-shaft and in line with the brake-levers, operating connections between said arms and the brake-levers, arms on the rock-shaft and located inside of the arms connected with the brake-levers and longer than the same, a segmental bar attached to said longer arms, hooks located on the side of the rock-shaft opposite the segmental bar, and retracting-springs connecting said longer arms and the hooks.

33. The combination, in a car-brake, of wheel brake-shoes, hangers through which the wheel brake-shoes are supported rail brake-blocks, brake-levers fulcrumed on the rail brake-blocks, arms of the levers and through which the rail brake-blocks and the wheel brake-shoes are connected, braces for the outer ends of the rail brake-blocks, and a tie-rod between the braces of the rail brake-blocks and loosely connected therewith.

34. The combination, in a car-brake, of wheel brake-shoes, hangers through which the wheel brake-shoes are supported, rail brake-blocks, brake-levers fulcrumed on the rail brake-blocks, arms of the levers and through which the rail brake-blocks are connected, braces for the outer ends of the rail brake-blocks and having jaws thereon embracing said brace-blocks, wings or lugs on said jaws embracing the inner sides of the wheel brake-blocks, and a tie-rod loosely engaging openings in said wings or lugs.

CHARLES V. ROTE.

Witnesses:
C. G. BASSLER,
WM. R. GERHART.